(12) United States Patent
Petschek

(10) Patent No.: US 6,820,639 B2
(45) Date of Patent: Nov. 23, 2004

(54) THERMAL COVER FOR BACKFLOW PREVENTION ASSEMBLIES

(75) Inventor: Eric Bradley Petschek, Fort Collins, CO (US)

(73) Assignee: Tepsin's, Windsor, CO (US)

( * ) Notice: Subject to any disclaimer, the term of this patent is extended or adjusted under 35 U.S.C. 154(b) by 150 days.

(21) Appl. No.: 10/331,825

(22) Filed: Dec. 30, 2002

(65) Prior Publication Data

US 2004/0123905 A1 Jul. 1, 2004

(51) Int. Cl.[7] ............................................. F16L 59/08
(52) U.S. Cl. ..................... 137/382; 137/375; 137/377; 138/149
(58) Field of Search ................................ 137/377, 382, 137/375; 138/149

(56) References Cited

U.S. PATENT DOCUMENTS

| | | | |
|---|---|---|---|
| 4,142,565 A | * 3/1979 | Plunkett, Sr. | ............... 137/375 |
| D349,754 S | 8/1994 | Pawar et al. | |
| 5,740,832 A | * 4/1998 | Griffin et al. | ............... 137/382 |
| 6,206,030 B1 | 3/2001 | Barthuly | |
| 6,293,301 B1 | * 9/2001 | Griffin et al. | ............... 137/377 |
| 6,520,201 B2 | * 2/2003 | Sweeney et al. | ............ 137/377 |

* cited by examiner

Primary Examiner—Kevin Lee
(74) Attorney, Agent, or Firm—Ancel W. Lewis, Jr.

(57) ABSTRACT

Thermal covers for backflow prevention assemblies disclosed to prevent freeze-ups have a cover body with a thermal top wall, opposed thermal side walls that flex toward and away from one another, opposed normally closed ends, a variable shaped bottom opening and an adjustable closure for said bottom opening. The side walls spread apart and said cover body fits down over said backflow prevention assembly with said bottom closure open. The bottom opening is closed by the bottom closure to a reduced size and fits around and against at least one of the vertical pipes connected to the backflow prevention assembly. A second embodiment has cover ends that are selectively opened and closed by adjustable end closures similar to the adjustable bottom closure. Opposed velcro-type co-operative first and second fastening members are used. The second embodiment opens up into a flat blanket-like configuration.

16 Claims, 4 Drawing Sheets

THERMAL COVER FOR BACKFLOW PREVENTION ASSEMBLIES

FIELD OF THE INVENTION

This invention relates to covers and more particularly to thermal covers for backflow prevention assemblies to prevent freeze-up.

BACKGROUND AND DESCRIPTION OF PRIOR ART

Ever since the arrival of the automatic lawn sprinkler systems, the possibility of cross contamination of public water supplies has caused great concern. To protect public water supplies from possible cross contamination by sprinkler systems, backflow prevention assemblies were introduced. When installed correctly these devices prevent cross contamination from back siphonage with a pressure vacuum breaker (PVB) and back pressure with a reduced pressure principle assembly (RP).

Typically, to allow these backflow prevention assemblies to function properly and meet manufacturer's specifications, these devices are installed outside and above ground, making them highly susceptible to freezing temperatures. In northern climates, sprinkler systems are either blown out with compressed air or drained to avoid freeze damage. In moderately temperate climates with little or no ground frost, systems may be used year 'round or may be left unused during the dormant season, assuming some protection is provided to the above ground water-carrying components.

Protecting the backflow prevention assemblies against freezing is paramount due to the relatively high cost of replacement parts and their tendency to "collect" cold air faster than their above-ground counterparts. Due to the unpredictability of spring and fall weather, the degree that these backflow prevention assemblies are prone to freeze damage and since many property owners and/or managers desire to water well into the transitional periods of weather, a simple method of protecting against such freeze damage is desirable.

Some previous attempts have been made to provide covers for backflow prevention assemblies. Barthuly U.S. Pat. No. 6,206,030 describes a cover for water backflow prevention that covers the backflow prevention assembly and anchors to the ground. Pawar et al. U.S. Pat. No. Des. 349,754 discloses a design for a cover for water backflow prevention that fits over the backflow prevention assembly but does not close the assembly along the bottom opening.

DISCLOSURE OF THE INVENTION

A first embodiment of the present invention disclosed has a thermal cover with a thermally lined top wall, opposed thermally lined side walls, fixedly closed end walls, and a variable shaped bottom opening with the side walls flexing outward to allow the cover to spread apart and fit down over the backflow prevention assembly. An adjustable bottom closure is closed and fits around at least one pipe extending through the bottom of the cover to close the bottom opening. A second embodiment is similar to the first but further has variable shaped openings along both opposed end walls to allow pipes connected to the backflow prevention assembly to extend through the ends as well as through the bottom. These end openings are selectively opened and closed with adjustable end closures. This embodiment will open up to a flat blanket like configuration. Velcro-type co-acting first and second fastening members are disclosed as an adjustable closure for both the bottom and sides. A thermal cover according to the present invention is easy to install and is adjustable to fit most all residential/light commercial backflow prevention assemblies. The disclosed thermal cover protects backflow prevention assemblies in case of a short overnight hard freeze, or during extended periods of ambient air temperatures hovering at or below the freezing mark.

DETAILED DESCRIPTION OF THE DRAWINGS

DETAILED DESCRIPTION OF THE INVENTION

Figure 1:
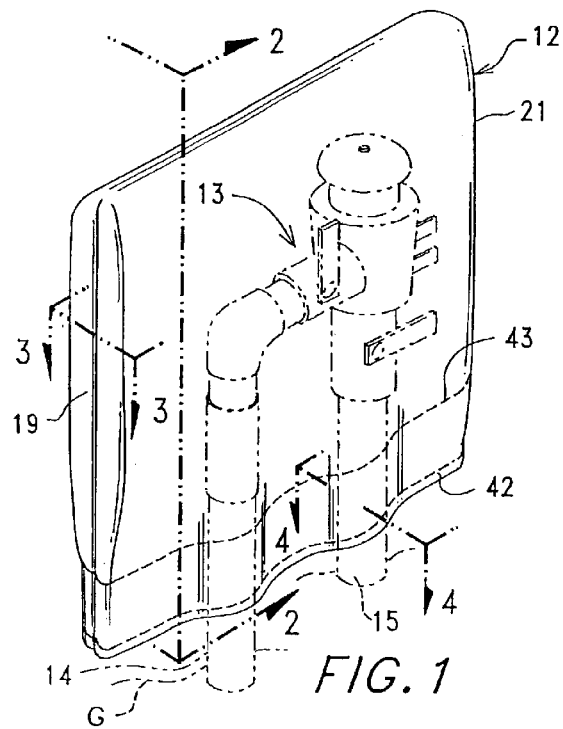
FIG. 1 is a perspective view of a first embodiment of a thermal cover embodying features of the present invention shown as enclosing a PVB type backflow prevention assembly connected to two vertical pipes extending into the ground shown in dashed lines.

Referring now to FIGS. 1–4 there is shown a first embodiment of thermal cover 12 covering a backflow prevention assembly 13 connected to two spaced vertical pipes 14 and 15 that extend down into the ground G. Assembly 13 is a pressure vacuum breaker (PVB). In general, the cover 12 has a cover body with a thermal top wall 16, opposed thermal side walls 17 and 18, opposed closed ends 19 and 21 and a variable shaped bottom opening 22. An adjustable bottom closure 23 selectively closes the bottom opening 22.

Figure 3:
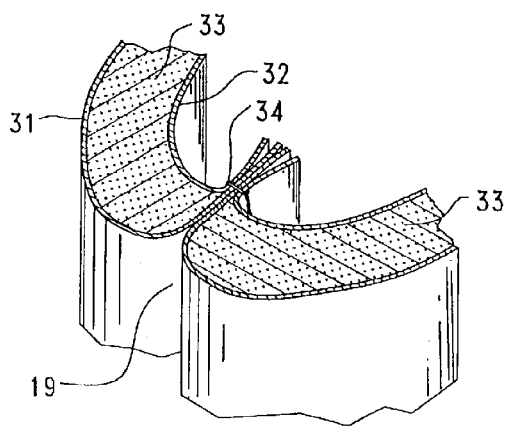
FIG. 3 is a sectional view taken along line 3—3 of FIG. 1.
Figure 2:
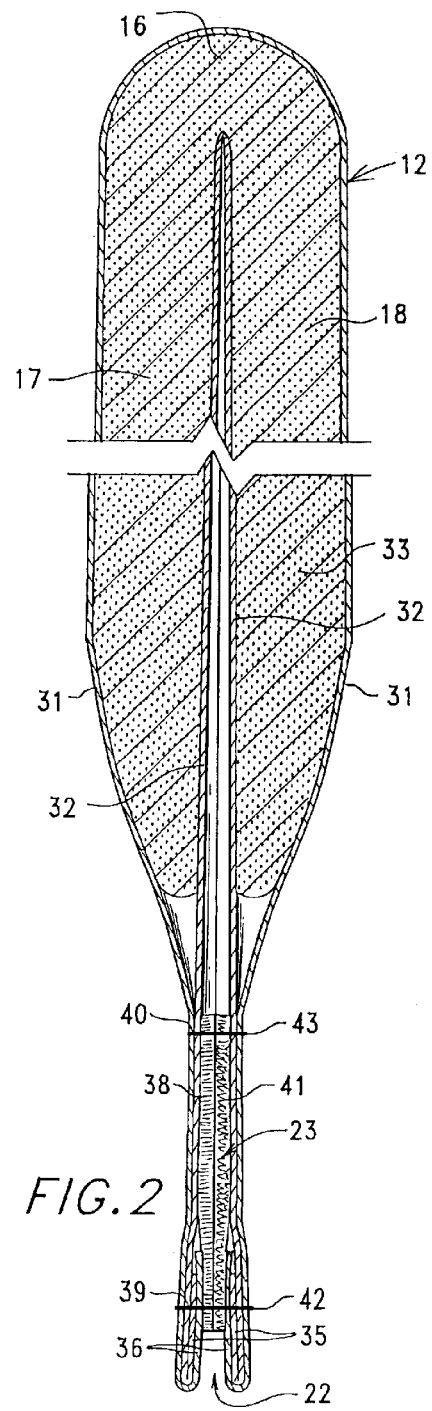
FIG. 2 is a sectional view taken along line 2—2 of FIG. 1.
Figure 4:
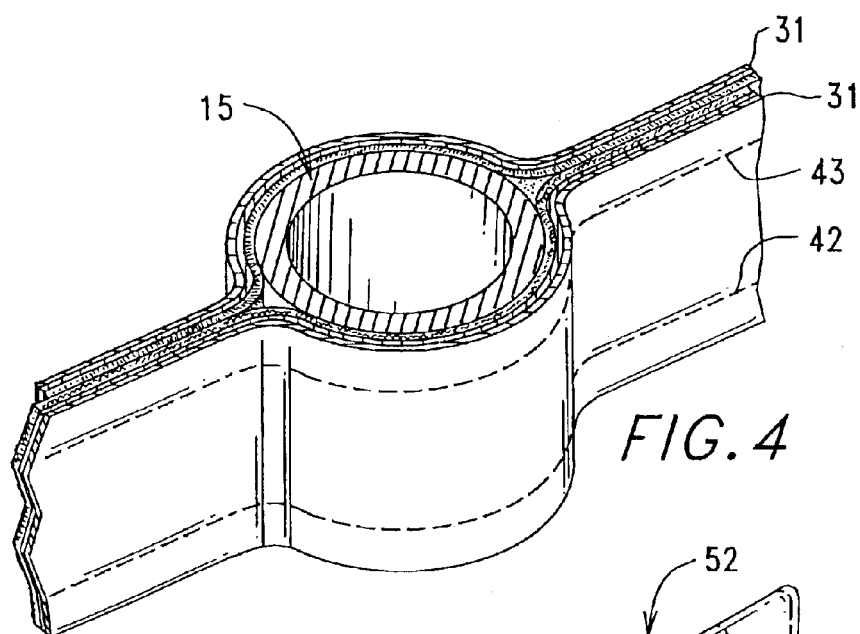
FIG. 4 is a sectional view taken along line 4—4 of FIG. 1.

The thermal cover 12 shown is made of a rectangular outer sheet 31 of flexible weather resistant material folded in the middle along its length and a rectangular inner sheet 32 of flexible weather resistant material folded along its length located inside outer sheet 31 with a thermal insulation 33 sandwiched between the outer and inner sheets. The ends of the outer and inner sheets 31 and 32 are closed by being folded in and are secured together by stitches 34 as shown in FIG. 3.

The outer and inner sheets 31 and 32 preferably are a flexible woven weather proof material with some UV inhibitors to allow the product to conform to various shapes and sizes of backflow devices and withstand the outdoor environment. The material used is dark in color to facilitate the absorption of heat through solar radiation. An example of material found suitable is 600×300 Denier polyester woven fabric coated with 0.5 mil PVC available through Blank Textiles, New York, N.Y.

The thermal insulation 33 may be of different type and may be provided as an inner layer and an outer layer. An inner or inside layer preferably is a flexible ¼" thick closed cell foam doubled up to achieve twice the insulating value. The flexibility and R-value are virtually unaffected by the presence of moisture which makes it a very desirable insulator in this possibly wet application. An example of an inner layer found suitable is a polyethylene foam (¼" thick) cut from rolls available from JDT Shipper Supply Co., Fort Collins, Colo. An outer or outside layer preferably is a flexible ¼" thick foil-backed bubble wrap used to help reflect the radiated warmth trapped in an unfrozen backflow device. An example of an inner layer found suitable is "Reflectix" bubble foil (¼" thick) and is available from Reflectix, Markleville, Ind.

The inner sheet 32 has a bottom inner back fold section 35. The outer sheet 31 has a bottom outer back fold section 36 that folds back over the bottom inner back fold section 35. The adjustable bottom closure 23 shown is opposed Velcro-type co-operative first and second fastening members 38 and 41. The first fastening member 38 is fastened along the inside of the inner sheet 32 and over the bottom outer back fold section 36 along one side as by lower stitches 39 and upper stitches 40. Similarly, the second fastening member 41 is fastened along the inside of the inner sheet 32 and over the outer bottom back fold section 36 along the opposite side as by lower stitches 42 and upper stitches 43. The first fastening member 38 is made of a series of upstanding rigid loops. The second fastening member 41 is made of a wooly synthetic material. This allows the bottom of the cover to be opened so that the side walls flex toward and away from one another and spread apart and can be placed down over the backflow prevention assembly and then the bottom opening is closed to a reduced size so that the fastening members 38 and 41 fit around and against the vertical pipes 14 and 15 and form a closed air space within the cover body surrounding the backflow prevention assembly. The adjustable bottom closure 23 is adjustable so that both the size of the opening and the position of the opening along the bottom may be changed or varied to accommodate pipes extending through the cover that are of different diameters and are at different positions along the bottom.

In using thermal cover 12 above described the fastening members 38 and 41 are separated from one another, the side walls 17 and 18 are spread apart and the cover fits down over the backflow prevention assembly 13. The fastening members 38 and 41 are then brought together to close the bottom opening to a reduced size and enclose the assembly 13 in a closed air space.

Figure 5:
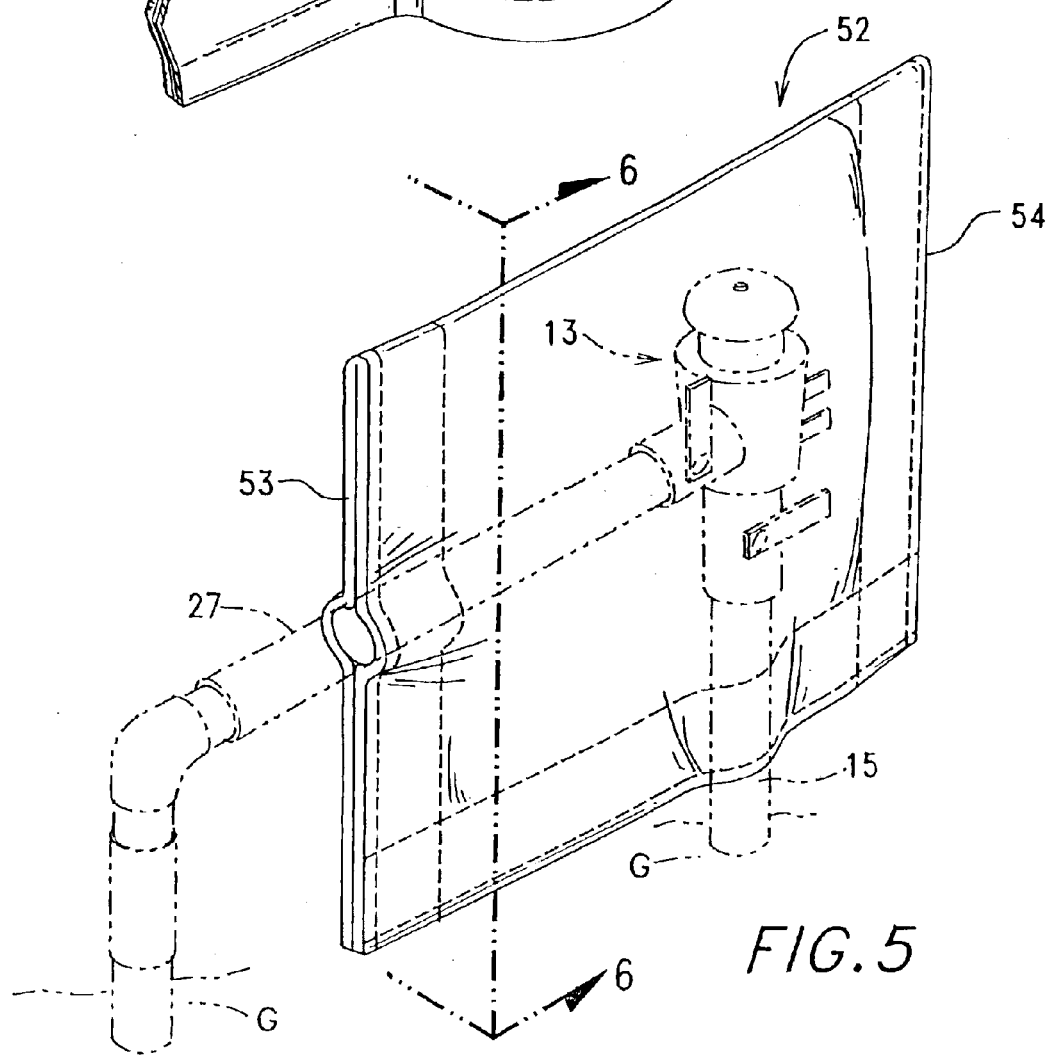
FIG. 5 is a perspective view of a second embodiment of a thermal cover embodying features of the present invention covering a PVB type backflow prevention assembly shown in dashed lines with one pipe extending through one end of the cover before extending into the ground.
Figure 6:
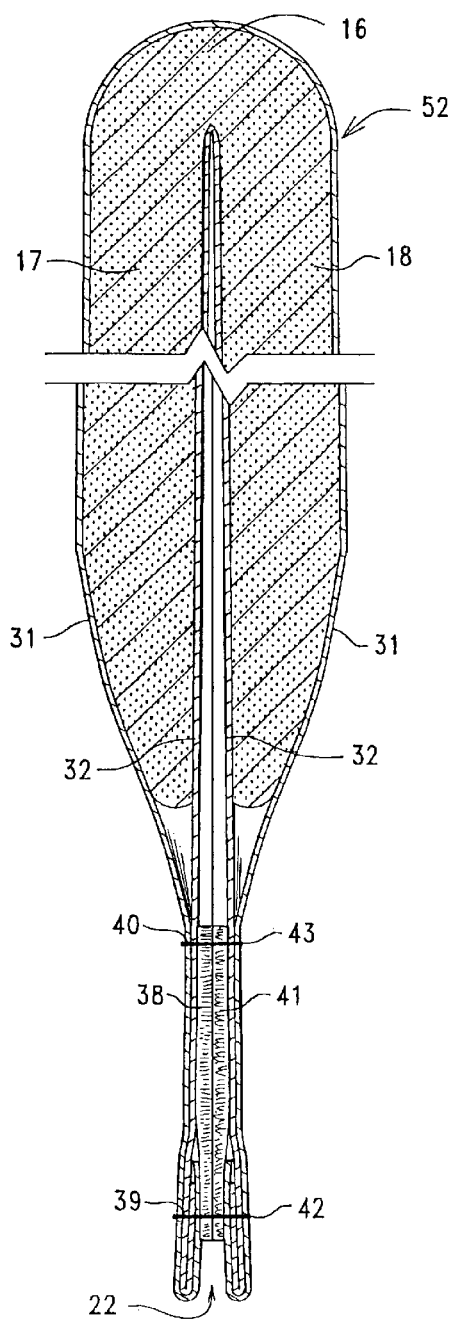
FIG. 6 is a sectional view taken along line 6—6 of FIG. 5.
Figure 7:
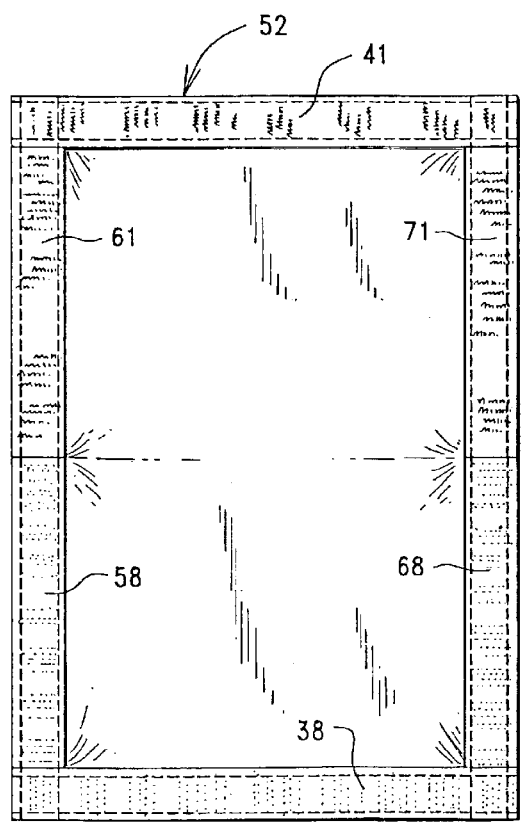
FIG. 7 is a plan view of the inside of the thermal cover shown in FIGS. 5 and 6 in an opened flat condition to resemble a flat blanket.

Referring now to FIGS. 5–7, there is shown a second embodiment of thermal cover 52 having the same general arrangement of thermal top wall 16 and thermal side walls 17 and 18 with a bottom opening 22 and adjustable bottom closure 23 in the bottom opening as described with reference to the embodiment in FIGS. 1–4. This second embodiment of thermal cover 52 is modified by providing open ends that are selectively opened and closed by adjustable end closure members 53 and 54 at opposite ends of a construction similar to the adjustable bottom closure 23 previously described. The adjustable end closure members 53 and 54 are adjustable so that both the size of the opening and the position of the opening along each end may be changed or varied to accommodate pipes extending through the cover that are of different diameters and are at different positions along the each end.

The adjustable end closure member 53 is provided by a first fastener member 58 (loops) and a second fastening member 61 (wooly) extending along one end. The first fastening member 58 is a first strip of material extending from the middle of the outer and inner sheets toward one bottom end and terminates at the inside edge of the first fastening member 38. The second fastening member 61 is a second strip of material extending from the middle of the outer and inner sheets toward the outer bottom end and terminates at the inside edge of second fastening member 41. The first and second strips of material are arranged end to end along the one end. The adjustable end closing member 54 is provided by a first fastening member 68 (loops) and a second fastening member 71 (wooly) along the opposite other end. The first fastening member 68 is a third strip of material extending from the middle of the outer and inner sheets toward the one bottom end and terminates in the inside edge of the first fastening member 38. The second fastening member 71 is a fourth strip of material extending from the middle of the outer and inner sheets toward the other bottom end and terminates at the inside edge of the second fastening member 71. This allows the cover body to open up to a flat blanket like configuration as shown in FIG. 7 and be placed around the assembly 13 and pipes connected thereto. A horizontal pipe 27 from the backflow prevention assembly 13 shown in FIG. 5 extends through the end of the cover body and against the fastening members 58 and 61 of adjustable end closure 53 fits around pipe 27 prior to extending down into the ground G.

Figure 8:
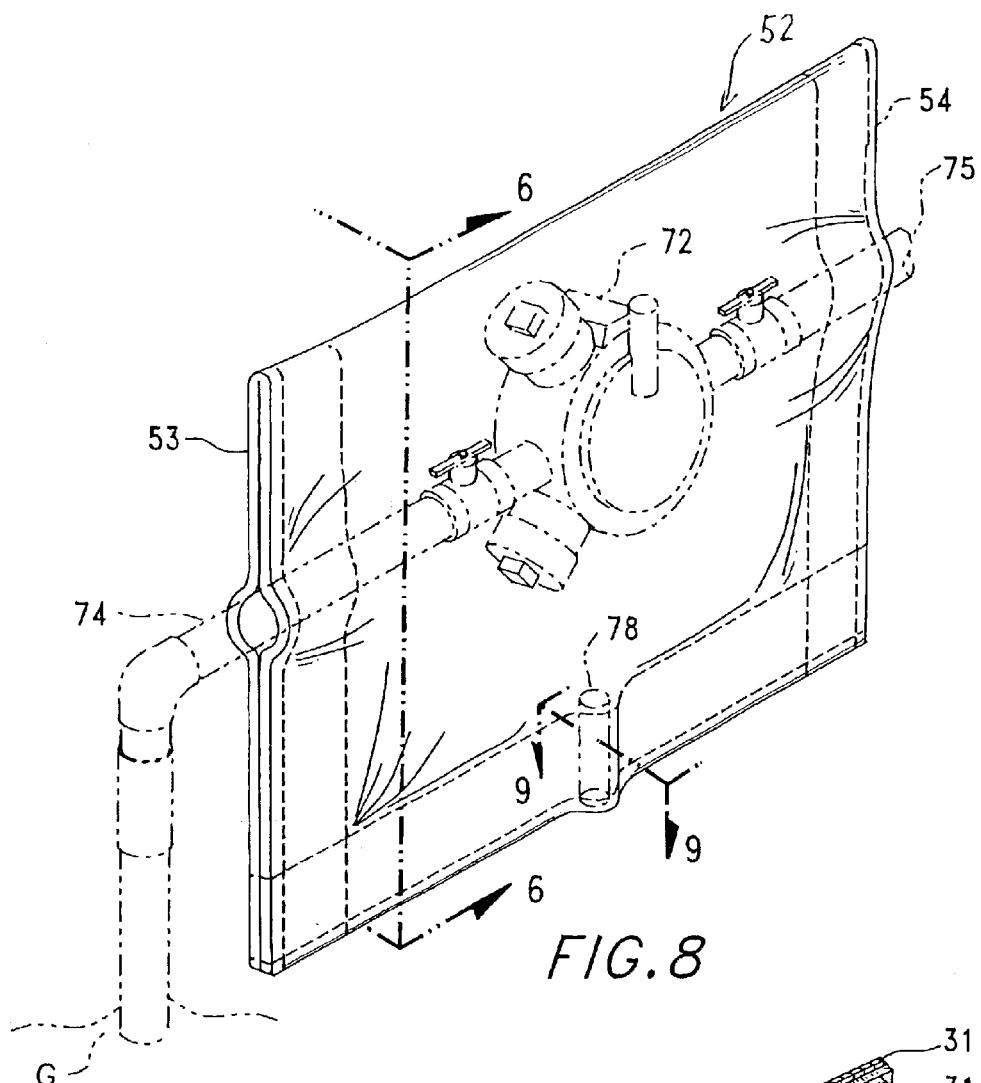
FIG. 8 is a perspective view of the thermal cover shown in FIGS. 5–7 covering an RP-type backflow prevention assembly shown in dashed lines with pipes connecting to the assembly extending through opposite ends of the thermal cover.
Figure 9:
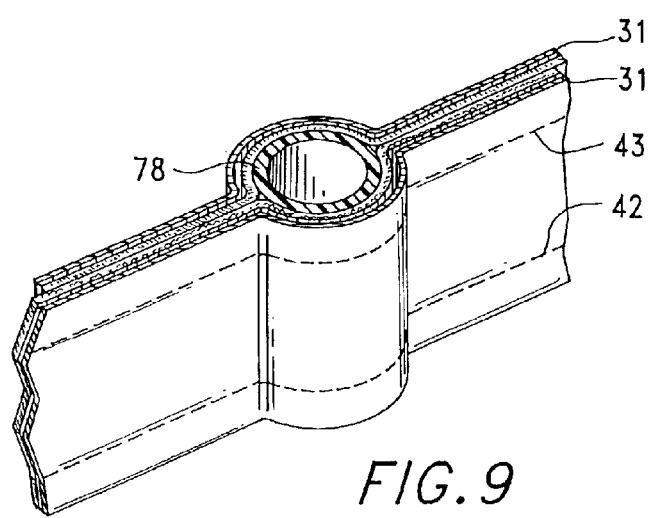
FIG. 9 is a sectional view taken along lines 9—9 of FIG. 8 showing a drain pipe in the bottom of the cover.

Referring now to FIGS. 8 and 9 there is shown the thermal cover 52 above described covering a backflow prevention assembly 72 illustrated as a RP type assembly. A horizontal pipe 74 connected to assembly 72 extends through one end of the cover body and the fastening members of end closure 53 fit around and against pipe 74 and the pipe then extends down into the ground G. A horizontal pipe 75 connected to assembly 72 extends through the other end of the cover body and the fastening members of end closure 54 fit around and against pipe 75 and the pipes then extends down into the ground G. A drainage pipe 78 is shown extending through and the fastening members 38 and 41 of bottom closure of cover 52 and these fastening members fit around and against pipe 78. The size of this pipe 78 will be equal to or greater than the size of the water carrying pipes. This drain pipe is necessary to allow the RP device to be able to function properly.

In using the thermal cover 52 above described the coacting members 38 and 41, 58 and 61 and 68 and 71 are separated from one another and the cover body is in a flat configuration as shown in FIG. 7. The cover body is placed down over the backflow prevention assembly 72 and the coacting members above described are brought together to fit around and against the pipes extending through the bottom and ends with openings through which the pipes extend being reduced in size and the assembly 72 is enclosed in a closed air space.

The thermal cover above described has been found to protect backflow prevention assemblies in the event of a short overnight hard freeze or an extended period of ambient air temperatures hovering at or just below the freezing mark. The ease of installation and the thermal cover's ability to universally protect most all residential/light commercial backflow prevention assemblies lends credence to its usefulness. Exposure to cold temperatures greater or longer than this would necessitate the addition of more insulation and possibly a safe source of heat to the backflow prevention assembly and possibly the aboveground pipes.

From the foregoing it is apparent that the thermal covers described feature thermal or heat insulated walls and adjustable closures in the bottom and/or ends of the cover that will fit a variety of different sized backflow prevention assemblies and different pipe sizes, locations and orientation so as to be a universal thermal cover. There is provided opposed side walls that spread apart and a variable shaped, selectively closed bottom opening and variable shaped, selectively closed end openings.

Although the present invention has been described with a certain degree of particularity, it is understood that the present disclosure has been made by way of example and that changes in details of structure may be made without departing from the spirit thereof.

What is claimed is:

1. A thermal cover for a backflow prevention assembly comprising:
    a cover body having a thermal top wall, opposed thermal side walls that flex toward and away from one another, opposed ends and a variable shaped bottom opening, and;
    an adjustable closure for said bottom opening, whereby said side walls spread apart and said cover body fits down over said backflow prevention assembly with said adjustable closure open, said bottom opening being closed by said adjustable closure to enclose said backflow prevention assembly within said cover body.

2. The thermal cover as set forth in claim 1, wherein said backflow prevention assembly has a pair of spaced vertical pipes extending into the ground, said adjustable closure closing said bottom opening to a reduced size and fits around and against at least one of said vertical pipes with said at least one vertical pipe extending down through said bottom opening of reduced size.

3. The thermal cover as set forth in claim 1, wherein said backflow prevention assembly has a pair of opposed pipes connected at opposite ends extending through opposite end openings in said cover body and down into the ground, and;
    adjustable end closures closing said end openings to a reduced size and fitting around and against said pipes extending through said end openings.

4. The thermal cover as set forth in claim 1, wherein said top wall and side walls are made of a flexible, durable, weather resistant material and of a dark color to facilitate the absorption of heat through solar radiation with said top wall and said side walls being thermally lined including a foil backed material to reflect radiated warmth from said assembly.

5. The thermal cover as set forth in claim 1, wherein said cover body includes a generally rectangular outer sheet folded in the middle along its length and a generally rectangular inner sheet inside said outer sheet and folded in the middle along its length with a layer of thermal insulation sandwiched between said outer and inner sheets.

6. The thermal cover as set forth in claim 5, wherein said inner sheet has a bottom inner back fold section, said outer sheet having a bottom outer back fold section that folds back over said bottom inner back fold section.

7. The thermal cover as set forth in claim 5, wherein the ends of said outer and inner sheets are folded in and are fixedly secured together to close said ends of said cover body.

8. The thermal cover as set forth in claim 1, wherein said adjustable closure for said bottom opening has opposed coacting, releaseable fastened first and second fastening members.

9. The thermal cover as set forth in claim 8, wherein said fastening members are of the velcro-type, one of said fastening members being made of a wooly synthetic material and the other said fastening members being made of a material having a series of upstanding rigid loops, said fastening members connect to one another when brought together and separate from on another upon the application of a pulling force.

10. The thermal cover as set forth in claim 5, wherein said outer and inner sheets have end openings that are selectively closed by an adjustable end enclosure at each end.

11. The thermal cover as set forth in claim 10, wherein each of said adjustable end closures have opposed coacting releaseably fastened first and second fastening members.

12. The thermal cover as set forth in claim 11, wherein said fastening members are of the velcro-type, one said fastening member being made of a wooly synthetic material and the other of said fastening members being made of a material have a series of upstanding rigid loops, said fastening members connect to one another when brought together and separate from one another upon the application of a pulling force.

13. The thermal cover as set forth in claim 11, wherein the said first fastening member is a first strip of material extending from the middle of said sheets toward one bottom end along one end, said second fastening member is a second strip of material extending from the middle of said sheets toward an opposite bottom end along said one end, said first and second strips of material being arranged end to end along said one end, said first fastening member at the other end is a third strip of material extending from the middle of said sheets toward said one bottom end along said other end, said second fastening member at said other end is a fourth strip of material extending from the middle of said sheets toward the opposed bottom end along said other end, said third and fourth strips of material being arranged end to end.

14. The thermal cover as set forth in claim 1, wherein said closure is adjustable to vary the size of said opening and the position of the opening along said cover body.

15. A thermal cover for a backflow prevention assembly having a pair of spaced vertical pipes extending into the ground, said cover comprising:
    a cover body having a top wall, opposed side walls that flex toward and away from one another, opposed ends and a variable shaped bottom opening, said cover body including a generally rectangular outer sheet folded in the middle along its length and a generally rectangular inner sheet inside said outer sheet and folded in the middle along its length with a layer of thermal insulation sandwiched between said outer and inner sheets, the ends of said outer and inner sheets being folded in and fixedly secured together to close both ends of said cover body, said inner sheet having a bottom inner back fold section, said outer sheet having a bottom outer back fold section that folds back over said bottom inner back fold section, and;
    an adjustable closure for said bottom opening, whereby said side walls spread apart and said cover body fits down over said backflow prevention assembly with said bottom closure open, said bottom opening being closed by said bottom closure to a reduced size and fits around and against at least one of said vertical pipes to enclose said backflow prevention assembly within said cover body with said at least one pipe extending down through said bottom opening of reduced size.

16. A thermal cover for a backflow prevention assembly having a pair of spaced vertical pipes extending into the ground, said cover comprising:

a cover body having a top wall, opposed side walls that flex toward and away from one another, opposed ends each with a variable shaped end opening and a variable shaped bottom opening, said cover body including a generally rectangular outer sheet folded in the middle along its length and a generally rectangular inner sheet inside said outer sheet and folded in the middle along its length with a layer of thermal insulation sandwiched between said outer and inner sheets, the ends of said outer and inner sheets being folded in at both ends of said cover body, said inner sheet having a bottom inner back fold section, said outer sheet having a bottom outer back fold section that folds back over said bottom inner back fold section;

an adjustable bottom closure for said bottom opening and;

an adjustable end closure at each end, said adjustable bottom and end closures each having opposed coacting first and second fastening members, whereby upon the separation of said fastening members of said bottom and end closures said cover body may be opened to a flat blanket like configuration and placed down over said backflow prevention assembly and selectively closed at the ends and bottom around pipes connected to said backflow prevention assembly and extending through at least one of said closures with said ends and bottom opening being closed to a reduced size and fit around and against the associated pipes to enclose said backflow prevention assembly in said cover body.

\* \* \* \* \*